US009511664B2

(12) United States Patent
Mori (10) Patent No.: US 9,511,664 B2
(45) Date of Patent: Dec. 6, 2016

(54) BRACKET ASSEMBLY (71) Applicant: Showa Corporation, Gyoda-shi (JP)

(72) Inventor: Kenichi Mori, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/664,109

(22) Filed: Mar. 20, 2015

(65) Prior Publication Data
US 2016/0075231 A1 Mar. 17, 2016

(30) Foreign Application Priority Data

Sep. 11, 2014 (JP) .................................. 2014-184763

(51) Int. Cl.
B60K 17/24 (2006.01)
F16C 27/06 (2006.01)
F16C 19/06 (2006.01)

(52) U.S. Cl.
CPC ............. *B60K 17/24* (2013.01); *F16C 27/066* (2013.01); *F16C 19/06* (2013.01)

(58) Field of Classification Search
CPC ....... B60K 17/24; F16C 27/066; F16C 19/06
USPC ............ 248/674, 65, 67, 74.1, 218.4, 219.3, 248/228.11, 230.1, 560; 384/536
See application file for complete search history.

(56) References Cited

U.S. PATENT DOCUMENTS

| 4,722,618 | A | * | 2/1988 | Matsumoto | ........... | F16C 27/066 |
|---|---|---|---|---|---|---|
| | | | | | | 384/535 |
| 5,208,981 | A | * | 5/1993 | Puzsik | .................. | B29C 33/123 |
| | | | | | | 264/263 |
| 5,314,255 | A | * | 5/1994 | Schwerdt | .............. | F16C 27/066 |
| | | | | | | 384/215 |
| 6,394,215 | B1 | | 5/2002 | Masuda | | |
| 7,103,975 | B2 | * | 9/2006 | Borsch | .................... | B60K 17/24 |
| | | | | | | 29/898.07 |
| 7,611,288 | B2 | * | 11/2009 | Lew | ........................ | B60K 17/24 |
| | | | | | | 29/898.07 |
| 8,186,641 | B2 | * | 5/2012 | Valovick | ................ | B60K 17/24 |
| | | | | | | 248/560 |
| 8,616,325 | B1 | * | 12/2013 | Mesa | ...................... | B60K 17/24 |
| | | | | | | 180/359 |
| 2003/0234134 | A1 | | 12/2003 | Blumke et al. | | |
| 2007/0065062 | A1 | * | 3/2007 | Roth | ....................... | B60K 17/24 |
| | | | | | | 384/536 |
| 2008/0205809 | A1 | * | 8/2008 | Lin | ........................ | B60K 17/24 |
| | | | | | | 384/536 |

FOREIGN PATENT DOCUMENTS

| JP | 04-046925 U | 4/1992 |
|---|---|---|
| JP | 04-193628 A | 7/1992 |
| JP | 05-178106 A | 7/1993 |
| JP | 07-040752 A | 2/1995 |

(Continued)

*Primary Examiner* — Anita M King
(74) *Attorney, Agent, or Firm* — Leason Ellis LLP (57) ABSTRACT A bracket assembly that supports an intermediate bearing fitted onto a propeller shaft, includes: a cylindrical member that supports the intermediate bearing; and a bracket fixed to the cylindrical member and to a vehicle body, the bracket includes an arc member that extends along an outer circumference surface of the cylindrical member, and legs that extend from ends of the arc member and are fixed to the vehicle body, and the arc member includes: a fixed portion that is fixed to the cylindrical member; a first fragile portion between one of the ends of the arc member and the fixed portion; and a second fragile portion between other of the ends of the arc member and the fixed portion, in which the first and second fragile portions are more fragile against a load in an axial direction of the cylindrical member than other portions of the arc member.

7 Claims, 7 Drawing Sheets (56) References Cited

FOREIGN PATENT DOCUMENTS

| JP | 2000-343972 A | 12/2000 |
| JP | 2001-277878 A | 10/2001 |
| JP | 2005-193870 A | 7/2005 |
| JP | 2005-297626 A | 10/2005 |
| JP | 2006-151138 A | 6/2006 |
| JP | 4323877 B | 9/2009 |
| JP | 2012-166591 A | 9/2012 |
| JP | 2013-103639 A | 5/2013 |

* cited by examiner

BRACKET ASSEMBLY

CROSS-REFERENCE TO RELATED APPLICATIONS

This application is based on and claims priority under 35 USC §119 from Japanese Patent Application No. 2014-184763 filed on Sep. 11, 2014, the entire content of which is incorporated herein by reference.

BACKGROUND OF THE INVENTION

1. Field of the Invention

The present invention relates to a bracket assembly.

2. Description of the Related Art

Propeller shafts have conventionally been used as a power transmission member coupling a transmission installed in a vehicle front section and a final reduction gear installed in a vehicle rear section.

When the length of such a propeller shaft exceeds a predetermined length, the critical speed becomes low and might be in a practical range. To avoid this risk, the propeller shaft of more than a predetermined length is divided at an intermediate portion. More specifically, the propeller shaft includes: a first propeller shaft disposed on the front side; a second propeller shaft disposed on a rear side; and a universal joint that couples the first propeller shaft and the second propeller shaft.

In the propeller shaft divided at the intermediate portion, the universal joint disposed at the intermediate portion is rotatably supported by an intermediate bearing structure attached to the vehicle body.

The intermediate bearing structure described above includes: an intermediate bearing fitted onto a shaft portion of the universal joint; a vibration isolation member fitted onto the intermediate bearing; a cylindrical member fitted onto the vibration isolation member; and a bracket that extends along an outer circumference surface of the cylindrical member, and extend toward the outer side in a horizontal direction to be fixed to a vehicle body.

A combination of the cylindrical member and the bracket is hereinafter referred to as a bracket assembly. A portion of the bracket extending toward the outer side in the horizontal direction to be fixed to the vehicle body by being fastened by a fastener such as a bolt is referred to as a leg.

Automobiles have been required to be deformable at a body panel in a front section of the vehicle body including an engine room with a motor and a transmission moved rearward, to absorb impact energy from the front side.

Thus, in some cases, the propeller shaft is configured in such a manner that the intermediate bearing structure is separated (detached) from the vehicle body in response to a head-on collision, so that the rearward movement of the motor and the like is not hampered. In this configuration, the universal joint is bendable with large angle and a steel tube of the first or the second propeller shaft is breakable, whereby the motor and the like can move rearward.

The configuration for separating the intermediate bearing structure from the vehicle body in response to the head-on collision includes the following configurations.

Japanese Utility Model Application Laid-open No. H 04-046925 discloses a configuration where a slit, extending forward from a bolt hole, is formed in a leg of a bracket. A stopper plate protruding toward the outer side in the horizontal direction is formed on the outer circumference surface of the first propeller shaft. When the first propeller shaft moves rearward due to the collision, the bracket is pressed toward the rear side by the stopper plate and the slit is widened, whereby the leg is detached from the bolt and thus the intermediate bearing structure as a whole is separated from the vehicle body.

Japanese Patent No. 4323877 discloses a configuration where a fragile portion is formed on the inner side of the bolt hole in a vehicle width direction, in the leg of the bracket. Thus, a load transmitted to the bracket due to the collision breaks the fragile portion, and thus the intermediate bearing structure is separated, leaving only a part of the leg on the vehicle body.

[Patent Document 1] Japanese Utility Model Application Laid-open No. H 04-046925

[Patent Document 2] Japanese Patent No. 4323877

In many cases, a resin member is disposed behind the intermediate bearing structure. Thus, with the techniques disclosed in Japanese Utility Model Application Laid-open No. H 04-046925 and Japanese Patent No. 4323877, the leg or part of the leg of the metallic bracket might be stuck into the resin member and the resin member might be damaged.

The present invention is made to solve the problem described above, and an object of the present invention is to provide a bracket assembly with which, when an intermediate bearing structure is separated from the vehicle body, a peripheral resin member is less likely to be damaged.

SUMMARY OF THE INVENTION

To solve the problem, a bracket assembly according to the present invention supports an intermediate bearing fitted onto a propeller shaft, and includes: a cylindrical member that supports the intermediate bearing; and a bracket that is fixed to the cylindrical member and to a vehicle body. The bracket includes an arc member that extends along an outer circumference surface of the cylindrical member, and legs that extend from ends of the arc member and are fixed to the vehicle body. The arc member includes: a fixed portion that is fixed to the cylindrical member; a first fragile portion between one of the ends of the arc member and the fixed portion; and a second fragile portion between other of the ends of the arc member and the fixed portion, in which the first and second fragile portions are more fragile against a load in an axial direction of the cylindrical member than other portions of the arc member.

In the invention described above, when the load due to collision acts on the propeller shaft, the load is transmitted to the arc member of the bracket through the intermediate bearing, the vibration isolation member, and the cylindrical member. Thus, the two fragile portions of the arc member, formed between the fixed portion and the ends, break.

As a result, the fixed portion that is disposed more on the inner side in the circumferential direction than the two fragile portions moves rearward, leaving only the portion more on the outer side than the fragile portions in the arc member and the legs fixed to the vehicle body.

The fixed portion moving rearward together with the intermediate bearing extends along the outer circumference of the cylindrical member and does not protrude toward the outer side in the horizontal direction. Thus, the fixed portion may come into contact but is not stuck into a peripheral resin member, whereby the resin member can be prevented from being damaged.

The fragile portions may be formed by locally reducing a width, in the axial direction of the cylindrical member, of the arc member.

The fragile portions may be formed by locally reducing a thickness of the arc member.

Preferably, the bracket includes two ribs each continuously extending along from a portion of the arc member more on an outer side, in a circumferential direction of the arc member, than the respective fragile portion, to the respective leg.

In the configuration described above, an area where the rib is formed is rigid. Accordingly, the load transmitted to the bracket due to the collision is less likely to break portions of the arc member between each fragile portion and each end, each end of the arc member (boundary between the arc member and the leg), and the legs. Thus, the portions more on the outer side in the circumferential direction than the fragile portions can be surely fixed to the vehicle body. Thus, the peripheral resin member can be prevented from being damaged.

The present invention can provide a bracket assembly with which a resin member disposed around the intermediate bearing structure is less likely to be damaged when the intermediate bearing structure is separated from the vehicle body.

DETAILED DESCRIPTION OF THE INVENTION

An embodiment of the present invention is described by referring to the drawings as appropriate.

In the description of the embodiment, a propeller shaft 1 is first described, and then an intermediate bearing structure 10 including a bracket holder 40, as a feature of the embodiment, is described.

Figure 1:
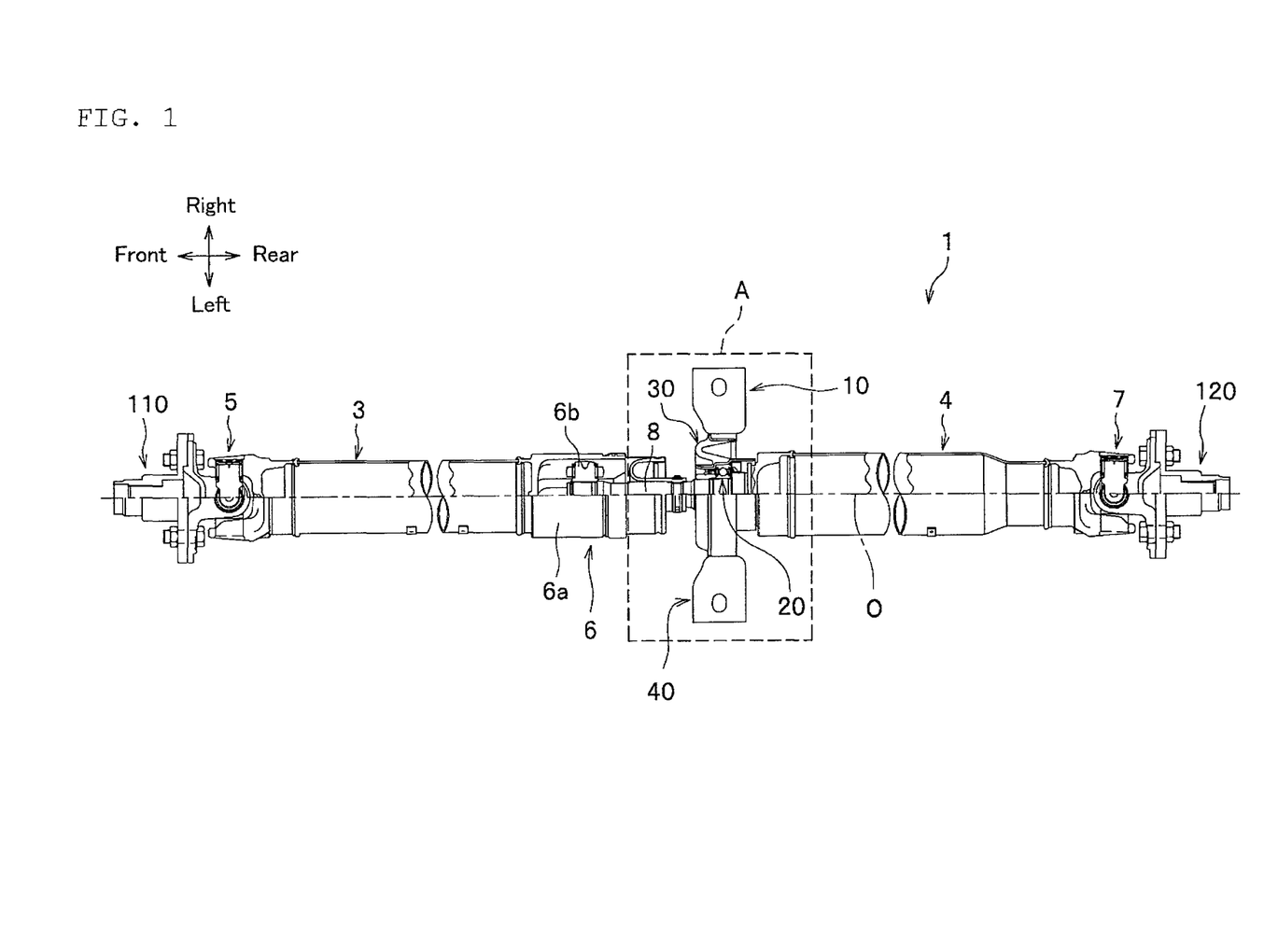
FIG. 1 is a plan view of a propeller shaft and an intermediate bearing structure.

As shown in FIG. 1, the propeller shaft 1 is installed in a four wheel drive vehicle with FF layout, and serves as a power transmission shaft through which power output from a transmission (not shown), installed in a front section of the vehicle, is transmitted to a final drive gear (not shown), installed in a rear section of the vehicle.

Companion flanges 110 and 120 are respectively coupled to an output shaft of the transmission and an input shaft of the final drive gear.

The propeller shaft 1, having a two piece structure divided at an intermediate portion, includes: a first propeller shaft 3 coupled to the companion flange 110 through a first universal joint 5; a second propeller shaft 4 coupled to the companion flange 120 through a second universal joint 7; and a constant velocity universal joint 6 that couples the first and the second propeller shafts 3 and 4.

The first and the second propeller shafts 3 and 4 are each a cylindrical steel tube extending in a front and rear direction along an axis O.

The constant velocity universal joint 6 is a tri-port type joint including: a stub shaft 8 that has a substantially cylindrical shape, is welded on a front portion of the second propeller shaft 4, and extends toward the front side; an outer race member 6a that has a cylindrical shape and is welded on a rear portion of the first propeller shaft 3; and a power transmitting member 6b provided at a distal end of the stub shaft 8.

Figure 2:
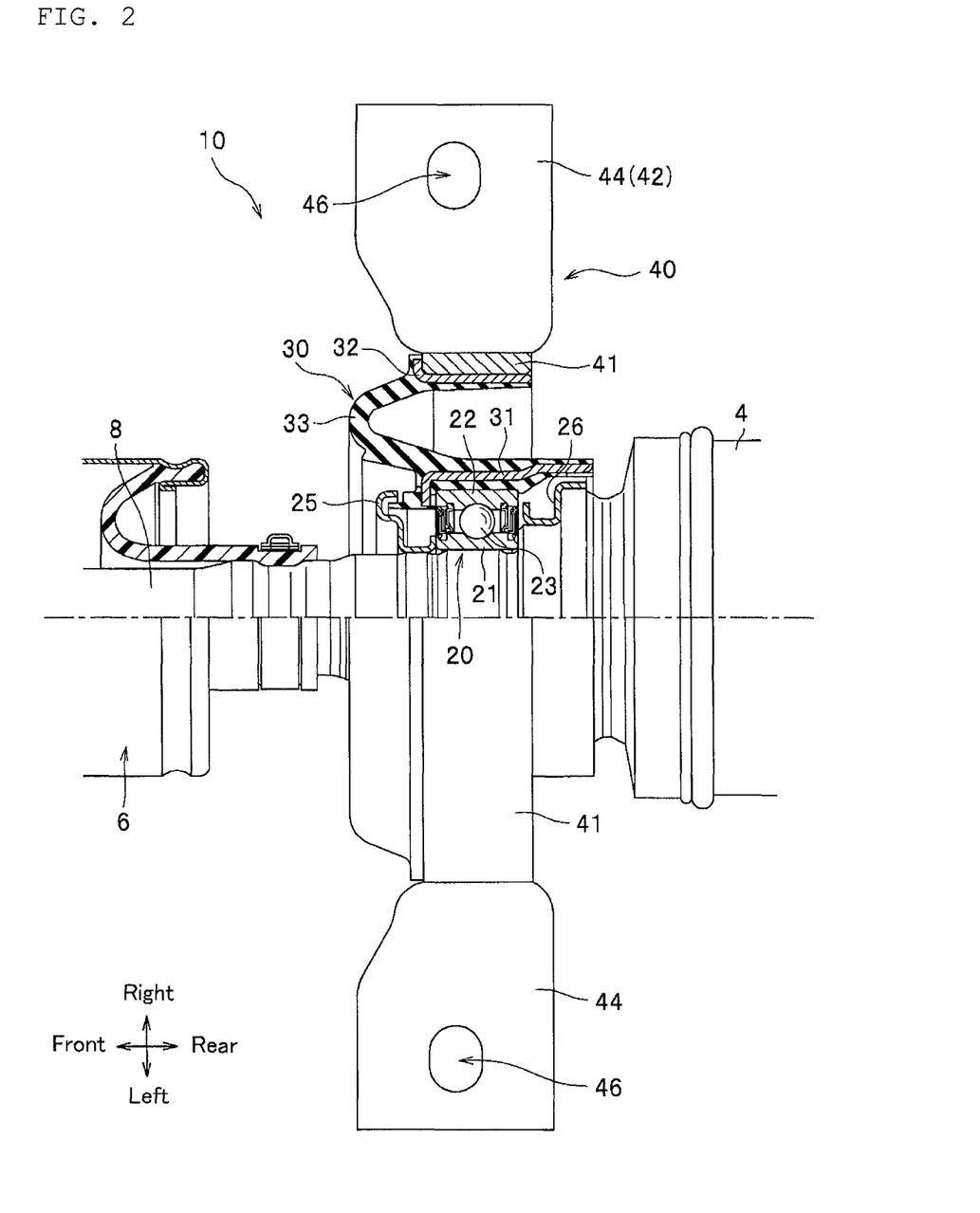
FIG. 2 is an enlarged view of an area surrounded by a frame line A in FIG. 1.

The intermediate bearing structure 10 rotatably supports an intermediate portion of the propeller shaft 1 in the front and rear direction. As shown in FIG. 2, the intermediate bearing structure 10 includes: an intermediate bearing 20 fitted onto the stub shaft 8; a vibration isolation member 30 fitted onto the intermediate bearing 20; and the bracket assembly 40.

The intermediate bearing 20 is a radial ball bearing in which a plurality of balls 23 are provided between an inner race 21 and an outer race 22. Dustcovers 25 and 26, fitted onto the stub shaft 8, are respectively disposed on front and rear sides of the intermediate bearing 20 to prevent mud water, dust, and the like from entering the intermediate bearing 20. The dustcover 25, disposed on the front side of the intermediate bearing 20, is in contact with the inner race 21 of the intermediate bearing 20, to hold the intermediate bearing 20.

The vibration isolation member 30 absorbs the vibration caused by the rotation of the propeller shaft 1 to thereby reduce the vibration transmitted to a vehicle body. The vibration isolation member 30 includes: an inner ring 31 fitted onto the outer race 22 of the intermediate bearing 20; an outer ring 32 that surrounds the inner ring 31 from the outer circumference side of the inner ring 31; and a mount 33 that is disposed between the inner ring 31 and the outer ring 32 and absorbs the vibration. The mount 33 is an elastic cylindrical rubber member that is integrally formed with the inner and outer rings 31 and 32 by insert molding.

Figure 3:
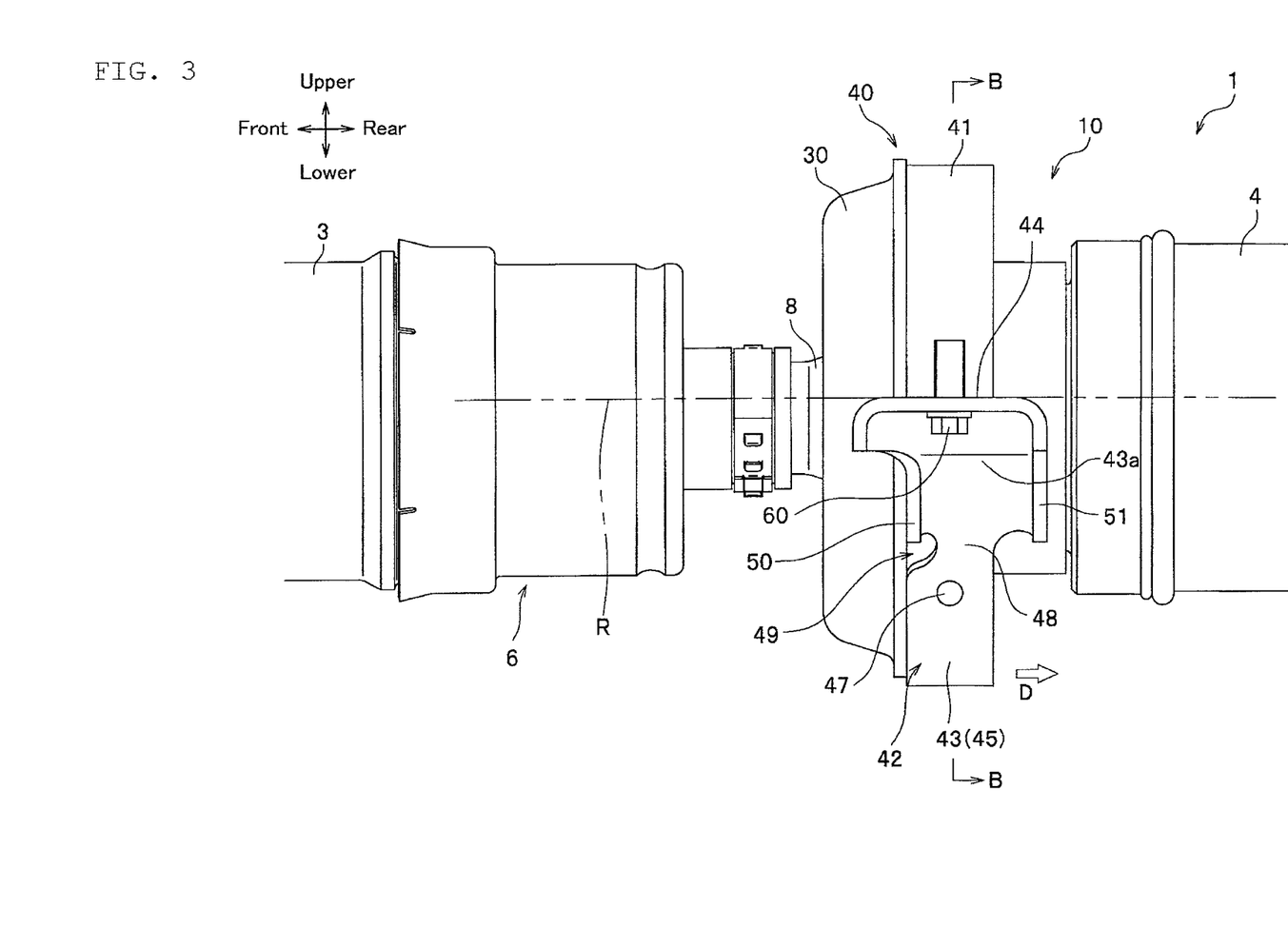
FIG. 3 is an enlarged partial side view of the propeller shaft and the intermediate bearing structure.
Figure 4:
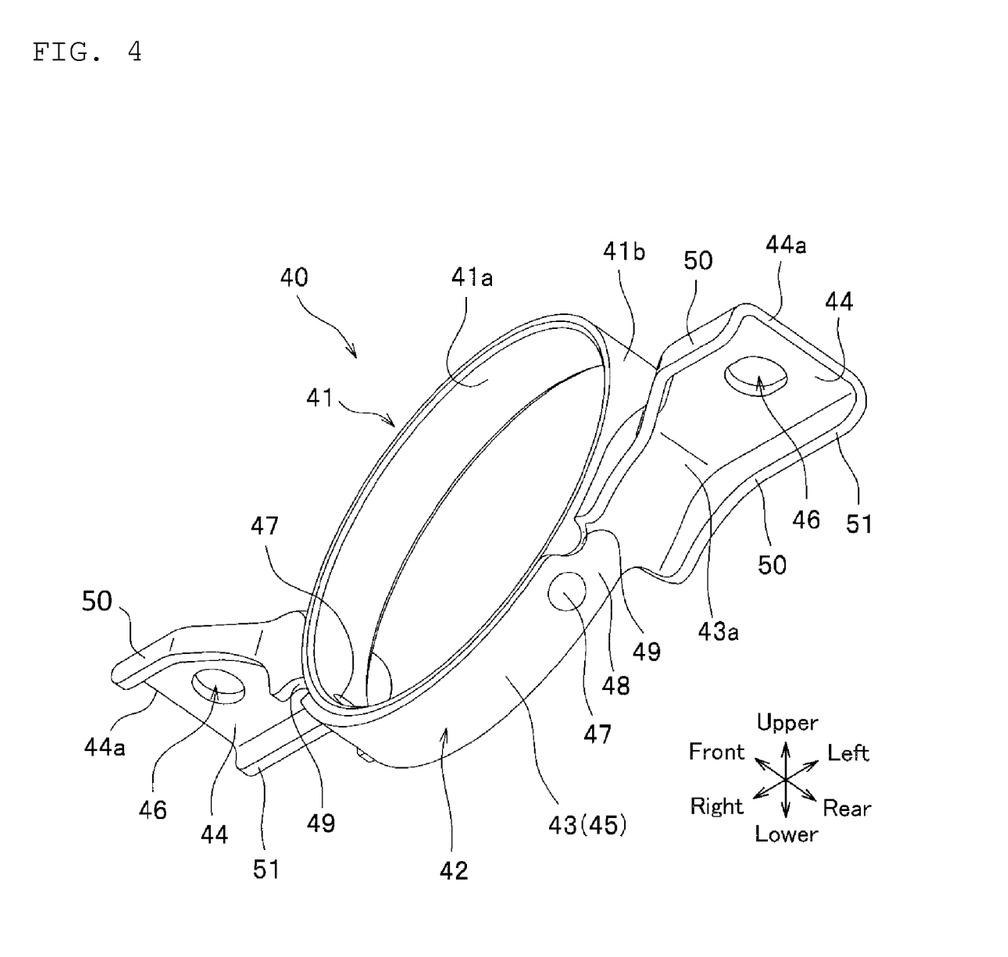
FIG. 4 is a perspective view of a bracket assembly.
Figure 5:
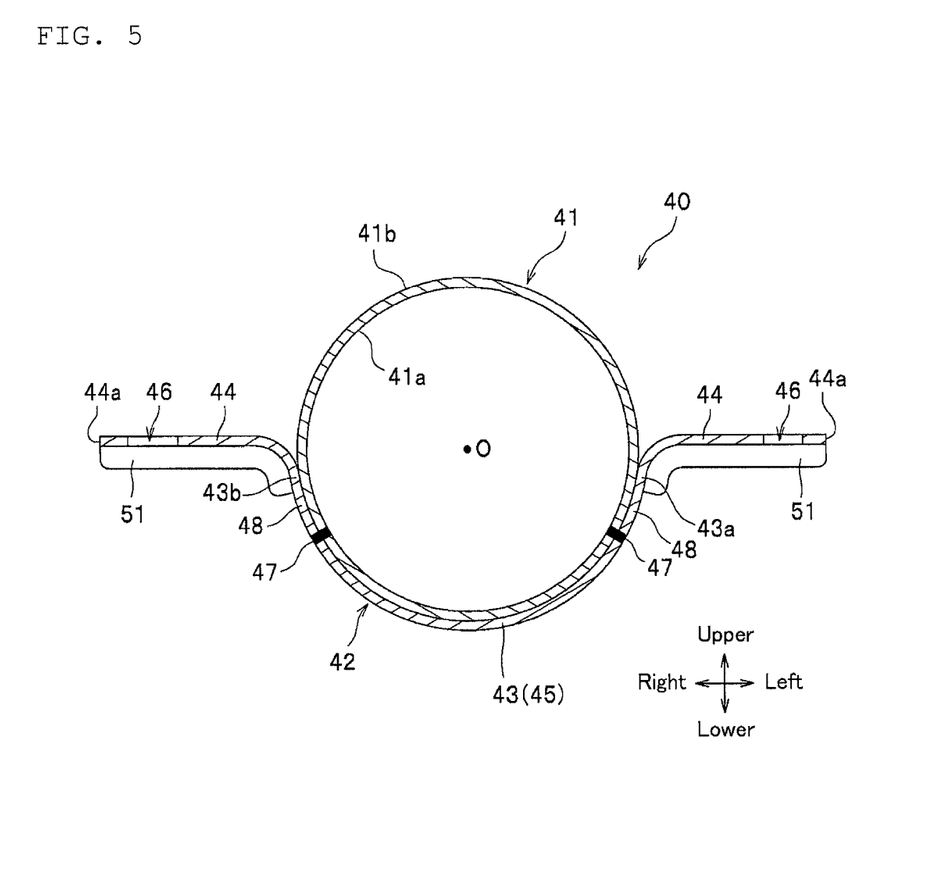
FIG. 5 is a cross sectional view of the bracket assembly taken along the line B-B in FIG. 3.

The bracket assembly 40 supports the intermediate bearing 20 fitted onto the stub shaft 8. As shown in FIG. 3 to FIG. 5, the bracket assembly 40 includes: a cylindrical member 41 that supports the intermediate bearing 20 via the vibration isolation member 30; and a bracket 42 fixed to the cylindrical member 41 and to the vehicle body.

The cylindrical member 41 is a metallic ring member. The vibration isolation member 30 is fixed in the cylindrical member 41 with the outer ring 32 of the vibration isolation member 30 press-fitted into an inner circumferential surface 41a of the cylindrical member 41.

As shown in FIG. 5, the bracket 42 is a metallic member including: an arc member 43 extending along an outer circumference surface 41b of the cylindrical member 41; and a pair of legs 44 extending toward the outer sides in a vehicle width direction respectively from one end and the other end 43a and 43b of the arc member 43.

The bracket 42 is formed by bending a metal plate. Thus, the components of the bracket 42, i.e., the arc member 43 and the pair of legs 44, are integrally formed, and have the same thickness as viewed in the front and rear direction.

The one and the other ends 43a and 43b of the arc member 43 according to the embodiment, correspond to the term "ends" of the arc member in the claims.

As shown in FIG. 3, the leg 44 is fastened by a bolt 60 to be fixed to the vehicle body, and has a surface parallel with a bottom surface R of the vehicle body (horizontal surface).

As shown in FIG. 4 and FIG. 5, bolt holes 46, through which shaft portions of the bolts 60 are inserted, are formed on outer sides in a left and right direction of the leg 44.

As shown in FIG. 5, the arc member 43 has a substantially semicircular shape as viewed in the front and rear direction.

The arc member 43 has spot welded portions respectively separated by a predetermined distance from the one and the other ends 43a and 43b toward the inner side in a circumferential direction. Thus, the arc member 43 is joined (fixed) to the cylindrical member 41.

The two spot welded portions as well as an area sandwiched by the two spot welded portions in the arc member 43, are hereinafter collectively referred to as a fixed portion 45. A portion of the arc member 43 joined by the spot welding is referred to as a joined portion 47.

As shown in FIG. 4 and FIG. 5, in the arc member 43, fragile portions 48, fragile against a load in the front and rear direction, are formed between the fixed portion 45 and the one and the other ends 43a and 43b. The fixed portion 45 sandwiched between the fragile portions 48 is separated when the two fragile portions 48 break.

The fragile portion 48 is formed by forming notches 49 on a front end side of the arc member 43 having a uniform width in the front and rear direction, so that the width of the arc member 43 in the front and rear direction is locally reduced.

As shown in FIG. 4, ribs 50 and 51 are respectively provided at front and rear edges of the arc member 43, by bending front and rear ends of the metal plate with which the arc member 43 and the pair of legs 44 are formed.

The ribs 50 and 51 each continuously extend from a portion, more on the outer side in the circumferential direction than the fragile portion 48 of the arc member 43, to an end 44a of the leg 44 through the one end 43a or the other end 43b of the arc member 43. Thus, a rigid area is provided from the portion, more on the outer side in the circumferential direction than the fragile portion 48, to the end 44a of the leg 44.

Next, a case where the propeller shaft 1 receives a load due to a head-on collision will be described by referring to the drawings.

In a normal state shown in FIG. 3, the pair of legs 44 of the bracket 42 are fastened by the bolts 60 to be fixed to the vehicle body, and the propeller shaft 1 is rotatably supported by the intermediate bearing structure 10.

When the propeller shaft 1 receives a load from the front side due to the head-on collision of the vehicle body, the load due to the collision on the cylindrical member 41 acts through the intermediate bearing 20 and the vibration isolation member 30.

As a result, a load toward the rear side acts on the arc member 43 of the bracket 42, joined to the cylindrical member 41 via the joined portions 47 (see the arrow D in FIG. 3).

Thus, a load, breaking the bracket 42 in the front and rear direction, acts on a portion, on each side of the bracket 42, between the joined portion 47 and a portion of the leg 44 on the outer side in the vehicle width direction (a portion fastened by the bolt 60). Thus, the pair of fragile portions 48 break in the front and rear direction.

Each of the ribs 50 and 51 is provided in the area extending from the portion more on the outer side in the circumferential direction than the fragile portion 48 to the end 44a of the leg 44, and thus is extremely unlikely to break even when the load due to the collision is large.

The one and the other ends 43a and 43b at the border between the arc member 43 and the pair of legs 44 might be less rigid due to the bending process. Still, the one and the other ends 43a and 43b are covered by the ribs 50 and 51 and thus are extremely unlikely to break.

Figure 6:
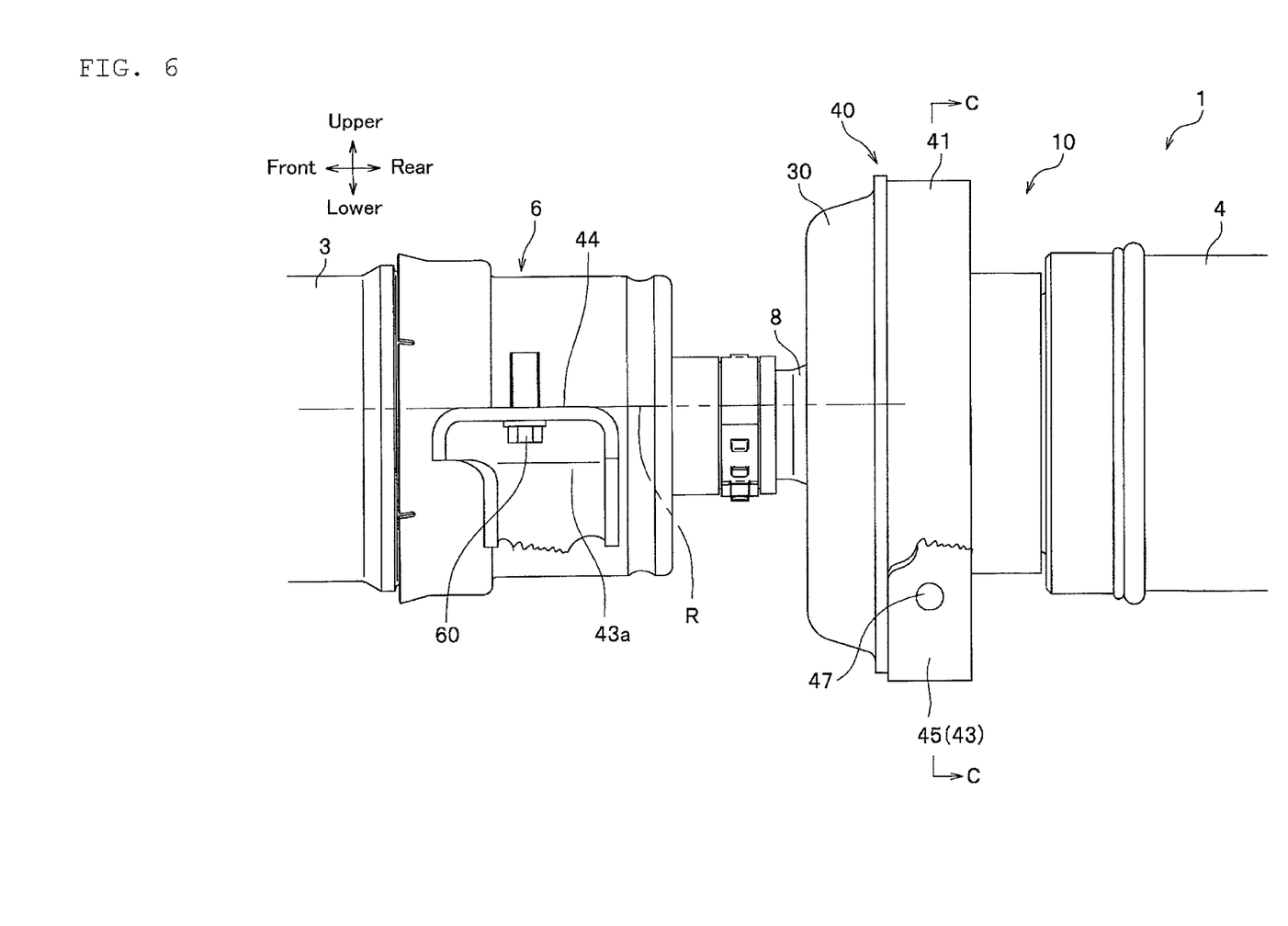
FIG. 6 is an enlarged partial side view of the propeller shaft and the intermediate bearing structure after collision.

As a result, as shown in FIG. 6, the fixed portion 45, more on the inner side in the circumferential direction than the pair of fragile portions 48, becomes moveable toward the rear side, together with the cylindrical member 41 and the vibration isolation member 30. Thus, the intermediate bearing 20 and the propeller shaft 1 are separated from the vehicle body.

All things considered, in the arc member 43, the portions more on the outer side in the circumferential direction than the pair of fragile portions 48 and the legs 44 remain fixed to the vehicle body.

Figure 7:
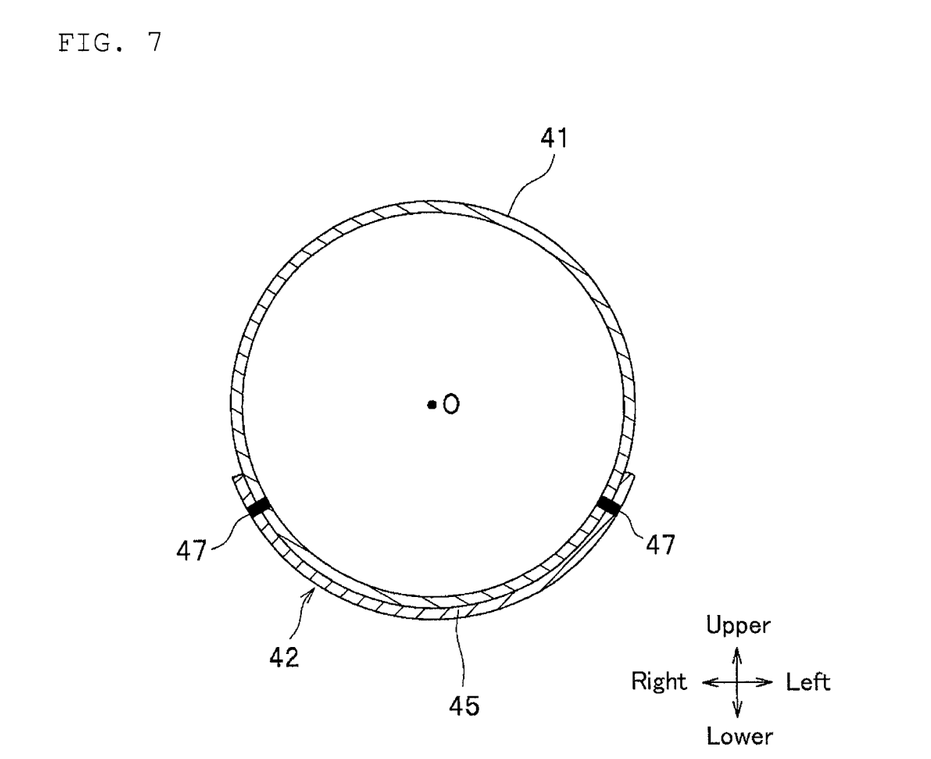
FIG. 7 is a cross sectional view of the bracket assembly taken along the line C-C in FIG. 6.

As shown in FIG. 7, the fixed portion 45 that moves toward the rear side together with the intermediate bearing 20 and the cylindrical member 41 extends on the outer circumference of the cylindrical member 41 and has no portion protruding toward the outer side in a horizontal direction. Thus, the fixed portion 45 does not stick into a peripheral resin member, and thus the resin member is prevented from being damaged.

The bracket assembly 40 according to the embodiment has been described. However, the present invention is not limited to the examples described in the embodiment.

The fragile portion 48 of the embodiment is formed by forming the notch 49 on the front end side to locally reduce the width in the front and rear direction. Alternatively, the present invention may employ a configuration where the notch is formed on a rear end side or a through hole is formed in a center portion in the front and rear direction, to locally reduce the width in the front and rear direction. The arc member 43 may be formed to have the thickness locally reduced to form the fragile portion 48. Thus the fragile portion 48 is not particularly limited.

The intermediate bearing structure 10 according to the embodiment is used in the propeller shaft 1 of the two piece structure. Alternatively, the present invention may be applied to the intermediate bearing structure 10 used in the propeller shaft 1 of a three-piece structure.

What is claimed is:

1. A bracket assembly that supports an intermediate bearing fitted onto a propeller shaft, the bracket assembly comprising:
    a cylindrical member that supports the intermediate bearing; and
    a bracket that is fixed to the cylindrical member and to a vehicle body, wherein
    the bracket comprises an arc member that extends along an outer circumference surface of the cylindrical member, and legs that extend from ends of the arc member and are fixed to the vehicle body,
    the arc member comprises: a fixed portion that is fixed to the cylindrical member; a first fragile portion between one of the ends of the arc member and the fixed portion; and a second fragile portion between other of the ends of the arc member and the fixed portion, in which the first and second fragile portions are more fragile against a load in an axial direction of the cylindrical member than other portions of the arc member; and
    wherein the fragile portions are formed by locally reducing a width, in the axial direction of the cylindrical member, of the arc member.

2. The bracket assembly according to claim 1, wherein the fragile portions are formed by locally reducing a thickness of the arc member.

3. The bracket assembly according to claim 2, wherein the bracket comprises two ribs each continuously extending along from a portion of the arc member more on an outer side, in a circumferential direction of the arc member, than the respective fragile portion, to the respective leg.

4. The bracket assembly according to claim 1, wherein the bracket comprises two ribs each continuously extending along from a portion of the arc member more on an outer side, in a circumferential direction of the arc member, than the respective fragile portion, to the respective leg.

5. A bracket assembly that supports an intermediate bearing fitted onto a propeller shaft, the bracket assembly comprising:
   a cylindrical member that supports the intermediate bearing; and
   a bracket that is fixed to the cylindrical member and to a vehicle body, wherein
   the bracket comprises an arc member that extends along an outer circumference surface of the cylindrical member, and legs that extend from ends of the arc member and are fixed to the vehicle body,
   the arc member comprises: a fixed portion that is fixed to the cylindrical member; a first fragile portion between one of the ends of the arc member and the fixed portion; and a second fragile portion between other of the ends of the arc member and the fixed portion, in which the first and second fragile portions are more fragile against a load in an axial direction of the cylindrical member than other portions of the arc member; and
   wherein the fragile portions are formed by locally reducing a thickness of the arc member.

6. The bracket assembly according to claim 5, wherein the bracket comprises two ribs each continuously extending along from a portion of the arc member more on an outer side, in a circumferential direction of the arc member, than the respective fragile portion, to the respective leg.

7. A bracket assembly that supports an intermediate bearing fitted onto a propeller shaft, the bracket assembly comprising:
   a cylindrical member that supports the intermediate bearing; and
   a bracket that is fixed to the cylindrical member and to a vehicle body, wherein
   the bracket comprises an arc member that extends along an outer circumference surface of the cylindrical member, and legs that extend from ends of the arc member and are fixed to the vehicle body,
   the arc member comprises: a fixed portion that is fixed to the cylindrical member; a first fragile portion between one of the ends of the arc member and the fixed portion; and a second fragile portion between other of the ends of the arc member and the fixed portion, in which the first and second fragile portions are more fragile against a load in an axial direction of the cylindrical member than other portions of the arc member; and
   wherein the bracket comprises two ribs each continuously extending along from a portion of the arc member more on an outer side, in a circumferential direction of the arc member, than the respective fragile portion, to the respective leg.

* * * * *